United States Patent
Jones

[15] 3,698,384
[45] Oct. 17, 1972

[54] OXYGEN CONSUMPTION RATE MONITOR

[72] Inventor: William J. Jones, Pittsburgh, Pa.

[73] Assignee: Westinghouse Electric Corporation, Pittsburgh, Pa.

[22] Filed: Nov. 3, 1970

[21] Appl. No.: 86,491

[52] U.S. Cl............128/2.07, 23/255 E, 204/195 B, 204/195 S
[51] Int. Cl. ................................................A61b 5/00
[58] Field of Search.....128/2.07, 185, 188, 191, 204, 128/2 E, 2.1 E; 23/255 E; 204/195 B, 195 S, 299

[56] References Cited

UNITED STATES PATENTS

| | | |
|---|---|---|
| 3,514,377 | 5/1970 | Spacil et al.............204/195 S |
| 3,006,339 | 10/1961 | Smith.....................128/191 R |
| 3,045,665 | 7/1962 | Mayat.....................128/2.07 |
| 3,358,683 | 12/1967 | Goitein....................128/204 |

FOREIGN PATENTS OR APPLICATIONS 865,777 2/1953 Germany...............128/191 R

Primary Examiner—William E. Kamm
Attorney—F. H. Henson, C. F. Renz and M. P. Lynch

[57] ABSTRACT

The disclosure relates to a system for monitoring the oxygen consumption rate of a process and includes a dual solid electrolyte electrochemical cell combination in which one cell is utilized as an oxygen measuring cell operating in a null mode, while the second cell is utilized as an oxygen pump which is responsive to a signal developed by the measuring cell. A gas source derived from the process provides a reference for the null measuring cell and also serves as a source of oxygen for the pump cell. Flow control means, including a flow splitter and a fluid dilution circuit, is provided to sample the process fluid and to maintain the sample flow and reference gas flow through the dual cell combination relatively constant.

4 Claims, 2 Drawing Figures

PATENTED OCT 17 1972  3,698,384

WITNESSES:
Bernard R. Gieguay
James F. Young

INVENTOR
William J. Jones
BY Michael P. Lynch
ATTORNEY

OXYGEN CONSUMPTION RATE MONITOR

BACKGROUND OF THE INVENTION

The invention relates in general to a system for monitoring the oxygen consumption of a process, and more particularly to a system for monitoring the oxygen uptake rate of biological processes, i.e. the oxygen uptake rate of a patient in clinical and diagnostic situations. Several devices are available for on-line monitoring of patient oxygen consumption but all exhibit operational limitations due to poor accuracy, need for frequent calibration and undesirable sensitivity to variations in ambient pressure and temperature, as well as sensitivity to variations in the flow of the process fluid being monitored, i.e. the patient's expired breath. These limitations are the result of the basic measurement technique which requires separate measurement, or knowledge of, both the process gas flow rate and the inlet-to-outlet oxygen concentration difference. The accuracy and stability with which these two time-varying quantities can be measured is quite poor thereby resulting in an inaccurate representation of oxygen consumption rate which is the product of these two variables.

The present invention circumvents these difficulties by measuring directly the quantity of oxygen removed from an inlet supply gas stream by the process by continuously and quantitatively "titrating" the exit stream of the process with oxygen to bring it into concentration equilibrium with the inlet gas stream. If all other gas exchange processes (such as $CO_2$ and $H_2O$ addition in the biological system) are also reversed, the resultant rate of oxygen addition is exactly equal to that removed by the process.

SUMMARY OF THE INVENTION

A basic dual electrochemical cell configuration and description of its operation is presented in the copending application of W. M. Hickam, "Oxygen Control and Measuring Apparatus," Ser. No. 866,791, filed Nov. 14, 1969 now U.S. Pat. No. 3,650,934.

In the dual electrochemical cell oxygen consumption monitor comprising the present invention, an oxygen reference media of known oxygen concentration corresponding to the oxygen containing gas supplied to the process is supplied to the null measuring cell to act as an oxygen reference, and subsequently utilized as an oxygen source for the pump cell. The expired process fluid to be monitored, which in the case of a patient is his expired breath, or a known fraction thereof, is drawn in sequence past the active areas of both the pump and null cells. A deviation of the oxygen concentration of the process fluid from the oxygen concentration of the reference oxygen media, which in the case of patient monitoring is the oxygen containing gas supplied to the patient, i.e., the inspired gas, results in the generation of an EMF output signal by the null measuring cell, which signal is supplied through a feedback and control circuit to the pump cell to adjust the pumping action of this cell until a null condition exists between the process fluid and the oxygen reference of the null measuring cell. The current flow in the pump cell during the oxygen ion pumping operation initiated by the feedback signal is a quantitative measure of the oxygen deficiency of the expired process fluid as compared to the inspired gas and can therefore be interpreted to represent the oxygen consumption rate of the process.

In the preferred embodiment, a parallel restrictive type flow splitter is used to divide the expired gas flow into multiple equal flow increments and pump means are utilized to draw a sample of the process fluid, which corresponds to one of the equal flow increments, and the oxygen reference by the flow sensitive dual electrochemical cells. However, inasmuch as the flow of the process fluid and consequently the flow of the sample will vary as the flow from the process itself varies, a gas dilution circuit is utilized to supplement the sample process fluid flow through the dual cell combination with reference gas in order to maintain a relatively constant flow through the flow sensitive dual cell combination.

Due to the null mode of operation of the null measuring cell measurements can be made precisely. Variations in temperature within the nominal electrochemical cell operating temperature range of 800°–950° C. are tolerable, thereby eliminating the need for precise temperature control required by most commercially available solid electrolyte oxygen monitors. Furthermore the measurement of the pump cell current, which can be made quite precisely, yields a measurement of the oxygen uptake rate of the process directly in standard units, thereby eliminating the need to compensate for ambient pressure and temperature variations.

DESCRIPTION OF THE DRAWING

The invention will become more readily apparent from the following exemplary description in connection with the accompanying drawings.

DESCRIPTION OF THE PREFERRED EMBODIMENT

Figure 1:
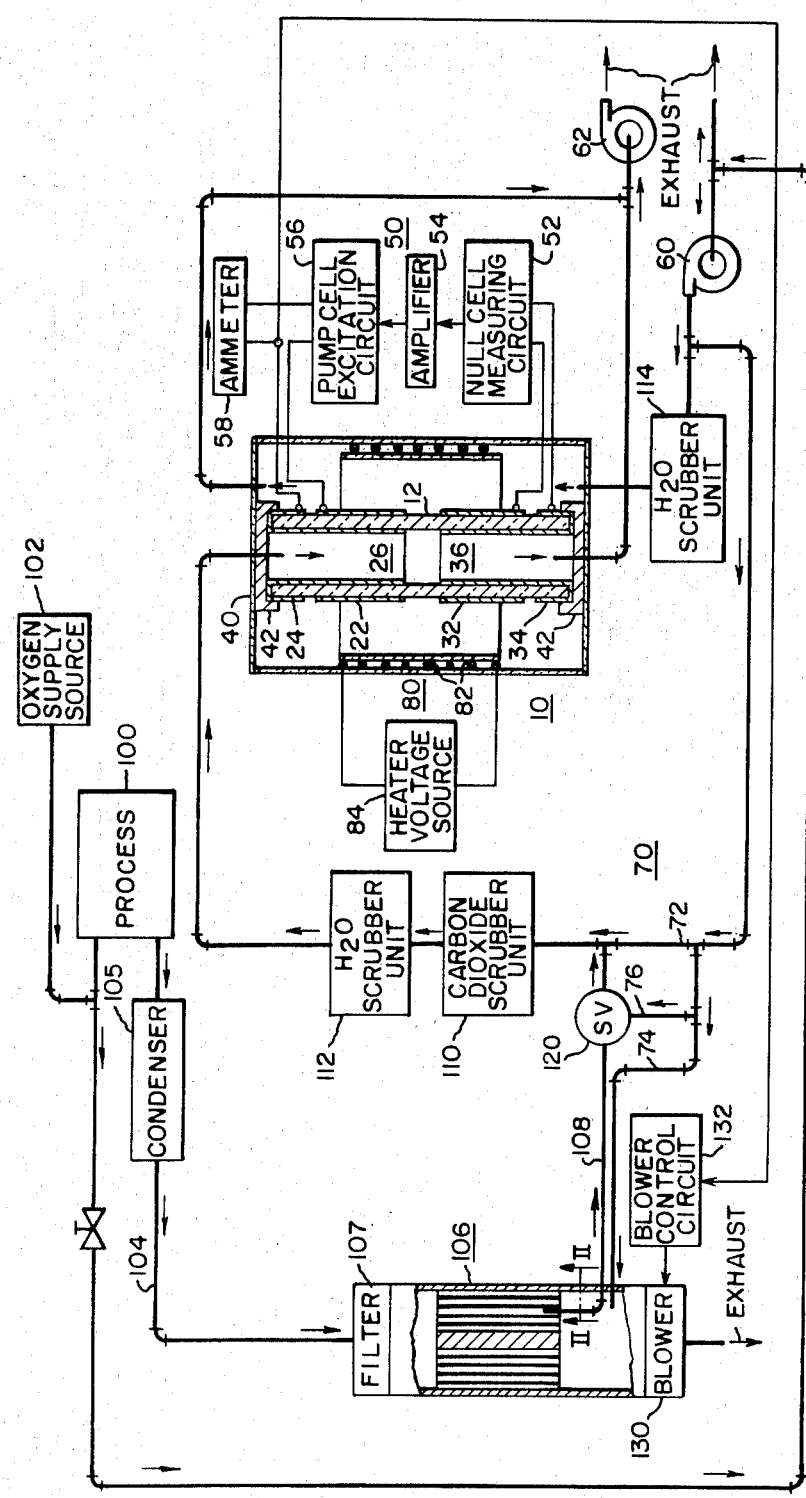
FIG. 1 is a schematic illustration of an embodiment of the invention.

Referring to FIG. 1 there is illustrated schematically an oxygen consumption system for monitoring the oxygen consumption of a process 100 including a dual electrochemical cell combination 10 comprising a pump cell 26, a null measuring cell 36, a feedback control circuit 50, a flow control circuit comprising pumps 60 and 62, and a flow dilution loop 70.

Figure 2:
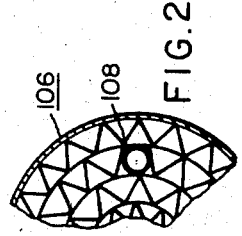
FIG. 2 is an enlarged sectional view of a flow splitter taken along line II—II of FIG. 1.

Oxygen is supplied to the process 100 from an oxygen-containing gas source 102. The exhaust gases from the process 100 including the unconsumed oxygen are directed through exhaust pipe 104 to an exhaust gas flow splitter 106. The flow splitter 106, which is illustrated in section in FIG. 2, is a commercially available item comprising a plurality of identical capillary elements which function to divide the total exhaust gas flow into equal discrete gas flow increments. A sample tube 108 is inserted at the outlet of one of said capillary elements to divert a predetermined portion of the total exhaust flow rate, hereinafter referred to as the sample gas, through the dual electrochemical cell combination 10 with the assistance of pump 62. Pump 62 likewise serves to draw the oxygen containing supply gas from the source 102 through the dual electrochemical cell combination 10. The dual electrochemical cell configuration 10 is one of several suitable configurations.

The dual electrochemical cell combination 10 comprises a tubular electrolyte member 12 of a solid material which readily conducts oxygen ions, but exhibits negligible electronic conductivity. The tubular electrolyte member 12 is open ended to permit the entrance of the sample gas at one end of said tubular electrolyte and the exhaust of the sample gas from the other end. Disposed on the outer surface of the tubular electrolyte member 12 in conductive contact therewith are operatively isolated electrically conductive electrodes 22 and 32. A second pair of electrically conductive electrodes 24 and 34 are disposed on the inner surface of the tubular electrolyte member 12 in substantially opposed relationship with the outer electrodes 22 and 32. Electrodes 22 and 24 in conjunction with the tubular electrolyte member therebetween form a first electrochemical cell 26. Electrodes 32 and 34 in conjunction with the tubular electrolyte member therebetween form a second electrochemical cell 36. Electrochemical cell 26 is functionally identified as an oxygen pumping cell while the electrochemical cell 36 is functionally identified as an oxygen null measuring cell. The housing 40 in conjunction with housing fittings 42 isolate the inner electrodes of the respective cells 26 and 36 from the outer electrodes thereby permitting the isolated passage of the sample gas through the interior of electrolyte 12 in direct contact with the inner electrodes 24 and 34, and a passage of the oxygen containing source gas through the housing 40 in direct contact with the external electrodes 22 and 32. A sample of the oxygen containing supply gas from source 102 serves as an oxygen reference media for the null measuring cell 36. The measuring cell 36, as described in the previously identified patent application, generates an EMF as a function of the difference in oxygen concentration between the reference oxygen and the oxygen concentration of the sample gas. The EMF signal generated as a result of oxygen unbalance between the sample gas and the oxygen reference is monitored by the null cell measuring circuit 52 and subsequently amplified by amplifier 54 and applied to pump cell excitation circuit 56. The oxygen ion pumping action of the pump cell 26 is controlled by the voltage applied across electrodes 22 and 24 in response to the feedback signal corresponding to the output of the amplifier 54. The oxygen ion pumping action of cell 26 operates to regulate the oxygen pumped into the sample gas at a rate sufficient to achieve null balance condition across the electrodes 32 and 34 of the null measuring cell 36. The current flow through the pump cell 26 resulting from the feedback signal can be monitored by an ammeter 58, and interpreted as an indication of the oxygen consumption rate of the process 100. The null method of measurement reduces the temperature sensitivity of the dual electrochemical cell combination 10 thereby permitting the use of the heater circuit 80 comprised of heating element 82 and a voltage source 84 of sufficient magnitude to maintain the temperature of the electrochemical cell combination 10 within a nominal operating range of approximately 800°–950° C.

The device 10 is however sensitive to variations in the flow rates of the sample gas and the reference oxygen supply inasmuch as they affect the null, or zero, voltage condition of the null measuring cell 36. Therefore in order to neutralize the variations in the flow of the sample gas in line 108 a dilution circuit 70 is provided to supplement the sample gas flow rate in line 108 by introducing oxygen supply gas from source 102 at a rate sufficient to maintain the sample gas flow rate through the dual electrochemical cell combination 10 at the rate established by pump 62. The flow rate established by pump 62 is set to equal or exceed the maximum expected sample gas flow rate provided by the process 100. Therefore if the exhaust from the process 100 is operating at maximum flow rate there will be little or no dilution of the sample gas flow rate in line 108 by the dilution loop 70. If however the exhaust flow rate from the process decreases below the maximum value thereby reducing the sample gas flow rate through 108, oxygen supply gas will be introduced through line 72 of the dilution loop into the sample gas flow through line 108 to supplement the sample gas flow rate sufficiently to increase the flow rate through the dual electrochemical cell combination 10 to the level established by pump 62. Oxygen supply gas in excess of that required to supplement the sample gas flow rate is exhausted through line 74. Inasmuch as the diluent gas is the reference gas, these gases are in concentration equilibrium and thus no change in the rate of oxygen pumping in the device 10 results from the addition of reference gas to the sample gas. However, any errors in the oxygen consumption rate measurement due to null imbalance, etc. are magnified by the dilution of the sample gas flow rate. This decrease in accuracy is directly related to the dilution ratio. For instance if the sample gas is diluted at a ratio of three parts oxygen supply gas to one part sample gas thereby establishing a ratio of 3:1 the dual electrochemical cell combination 10, which might normally exhibit an error fraction of one-quarter of one percent, would exhibit an error fraction of three-quarters of one percent.

The oxygen consumption monitor thus described has particular application in the medical field as a device for monitoring the oxygen uptake rate of a patient. In a medical application of this device a patient would represent the process 100 and the oxygen supply source 102 could be considered a respirator supplying gas containing specified concentration of oxygen to the patient. The oxygen gas composition breathed by the patient is termed the inspired gas, and the exhaust breath from the patient is termed the expired gas. The expired gas is directed through supply pipe 104 to the flow splitter 106. Additionally the gas of the patient is directed through condenser 105 and filter element 107 to remove excess moisture and foreign particles which could adversely affect the calibrated flow capillaries of the flow splitter 106. The flow fraction of the expired gas provided by the flow splitter 106 is further treated by a commercially available carbon dioxide scrubber unit 110 and a commercially available $H_2O$ scrubber unit 112. The $CO_2$-free inspired oxygen gas is drawn from the oxygen source or respirator 102 by pump 60 through the $H_2O$ scrubber 114 for use as an oxygen reference source for the null measuring cell 36 and as an oxygen supply source for pump cell 26.

A solenoid valve 120 is located in the sample exhaust gas line 108 as a means for zero adjusting the dual electrochemical cell combination 10. The zero adjust of the device 10 is accomplished by actuating solenoid valve 120 to prevent flow of the flow fraction of the expired gas through the device 10 leaving only the diluent (inspired) gas flowing through the dual cell combination in place of the sample exhaust gas and thereby establishing inspired gas in contact with both the inner and outer electrodes of the null measuring cell 36. The presence of gases containing identical oxygen content on both sides of the null measuring cell 36 should result in a zero electrical output as monitored by the null cell measuring circuit. In the event the electrical output from the cell 36 is not exactly zero, the zero adjust can be electrically accomplished through the adjustment of the null measuring circuit 52. In addition to providing the zero adjust feature, the solenoid valve 120 bypass line 76 provides means for flushing the solenoid valve with inspired gas to remove residue of old gas in the event a gas of different oxygen concentration is to be introduced as the inspired gas.

A factor to be considered in selecting the pump flow rate established by pump 60 as well as the diameter of the tubing in the dilution loop 70 is the requirement for maintaining the total gas pressure at the exhaust of line 74 downstream from the flow splitter 106 equal to the total gas pressure at the juncture of dilution loop line 72 with the gas sample line 108. This requirement is essential in order to maintain the gas flow through the capillary selected for the sample gas line 108 equal to the gas flow rate through the other capillaries comprising the flow splitter 106.

In an exemplary medical application in which the flow splitter 106 establishes an expired sample gas flow fraction of 1:1,000 and the pump 62 establishes a sample gas flow rate of approximately 50 cc/minute the diameter of the tubing is selected to insure that the sample gas is drawn through the dual electrochemical cell combination 10 at a rate of 25 cc/minute and inspired oxygen gas is likewise drawn through the dual electrochemical cell combination at a rate of 25 cc/minute. Pump 60 extracts a uniform flow rate of inspired gas from the oxygen source 102 for supply to the dual electrochemical cell combination. The gas flow rate established by pump 60 for this application would nominally be between 50 and 100 cc/minute so that sufficient reference gas is available to be drawn through the dual cell combination by pump 62 as well as providing sufficient inspired gas for dilution of the sample gas as described above. In this medical application the sample gas flow rate established by pump 62 represents what is considered to be the maximum expired sample gas flow fraction established by the patient. In the event the sample gas flow fraction established by the patient diminishes below this maximum level the dilution loop 70 operates to provide inspired gas flow rate through line 72 to supplement the gas flow rate established by the patient in order to achieve the desired 25 cc/minute constant flow rate.

In patient monitoring systems another important respiratory variable to be monitored is the patient's total expired gas flow rate per minute. Expiratory flow can be measured as a function of the pressure differential across the flow splitter 106. Thermal mass flow techniques may also be utilized to determine expiratory flow.

The medical application of the oxygen consumption rate monitor described thus far is concerned with patients whose expiratory efforts are sufficient to overcome the minimal back pressure created by the flow splitter 106. This is generally satisfactory for patient monitoring where the patient is at rest and connected to a respirator. However under certain conditions it is desirable to collect the patient's natural expiration in a forced draft to obviate the need for a fitted face mask, mouthpiece, or breathing tube. Similarly when used in exercise testing the patient's ventilatory flow rate may be very high in which case an undesirably high expiratory resistance is created by the flow splitter 106. In such instances a blower 130 may be added in line to draw a continuous stream of gas comprised of the patient's expired gas and a predetermined amount of inspired gas to insure total collection of the patient's expirations. The patient 100 inspires from and expires into this gas flow stream. A sample of the flow upstream from the patient 100 serves as a reference gas for the null cell 36.

For many applications the speed of the blower and thus the respiratory dilution flow rate may be made substantially constant at some predetermined relationship to the patient's expiratory flow rate. Typically a ratio of total gas stream flow to the patient's ventilatory flow of $3:n$, where $n$ is a number between 3 and 10 and depends in part on the respiratory equipment utilized. This ratio is established to prevent the patient from rebreathing expired gases. In such constant flow applications, the sample dilution flow may be set at a constant value which is equal to or slightly in excess of the resultant sample flow rate.

For exercise testing in which the patient's ventilatory flow rate may fluctuate over a wide range, the selection of a constant respiratory dilution flow rate adequate for maximum ventilatory demands would result in unnecessary dilution at lower ventilatory demands and consequently would result in measurement in accuracies at lower oxygen uptake rates and ventilatory flow rates. Therefore blower 130 is chosen to be a variable speed blower which is automatically controlled by the blower control circuit 132 in response to the ventilatory demands of the patient as represented by the current flow in the pump cell 26. In other words, the ventilation rate of the patient is a function of the measured oxygen uptake rate; thus the speed of the blower 130 and consequently the respiratory dilution flow rate is automatically adjusted to maintain a predetermined relationship between the patient's oxygen consumption rate and a respiratory dilution flow rate.

What is claimed is:

1. Apparatus for determining the oxygen consumption rate of a process having an input source of oxygen and an exhaust, comprising in combination, a first solid electrolyte electrochemical cell having a first electrically conductive electrode and a second electrically conductive electrode, means for maintaining an oxygen reference media of known oxygen concentration at said second electrode, means for supplying a sample of said process exhaust gas to said first electrode, said first solid electrolyte electrochemical cell generating an EMF as a function of the difference in oxygen concentration between the oxygen reference media and the sample exhaust gas, a second solid electrolyte electrochemical cell having a first electrically conductive electrode and a second electrically conductive electrode, means for providing an oxygen containing media at said second electrode of said second electrochemical cell, means for supplying said sample exhaust gas to said first electrode of said second electrochemical cell prior to supplying said sample exhaust gas to said first electrochemical cell, and a feedback circuit means operatively connected between the electrodes of said first solid electrolyte electrochemical cell and the electrodes of said second solid electrolyte electrochemical cell to apply the EMF signal generated by said first solid electrolyte electrochemical cell as an excitation signal across the electrodes of said second solid electrolyte electrochemical cell, said second solid electrolyte electrochemical cell operating as an oxygen ion pump, the current generated by said second solid electrolyte electrochemical cell as a result of the applied excitation from said feedback circuit changing the oxygen concentration of the sample exhaust gas until the oxygen concentration of the sample exhaust gas substantially equals the oxygen concentration of the oxygen reference media of said first solid electrolyte electrochemical cell thereby resulting in an EMF signal output of approximately zero from said first solid electrolyte electrochemical cell, said current flow in said second solid electrolyte electrochemical cell being an indication of the oxygen consumption rate of said process, and blower means including a variable speed blower and a blower speed control circuit means operatively coupled between said second solid electrolyte electrochemical cell and said variable speed blower to control the speed of the blower as a function of the current generated by said solid electrolyte electrochemical cell.

2. Apparatus as claimed in claim 1 including pump means for drawing said sample exhaust gas by said first electrodes of said first and second solid electrolyte electrochemical cell at a predetermined flow rate, and a sample exhaust gas dilution means for supplementing said sample exhaust gas flow rate in the event the sample exhaust gas flow rate decreases below said predetermined level in order to reestablish said predetermined gas flow rate.

3. Apparatus as claimed in claim 2 wherein said oxygen media supplied to said second electrodes of said first and second solid electrolyte electrochemical cell is the oxygen containing gas supplied to said process inlet from said source of oxygen, said pump means drawing said oxygen containing gas by said second electrodes at the predetermined flow rate established for said sample exhaust gas.

4. Apparatus as claimed in claim 3 wherein said sample exhaust gas dilution means supplements said sample exhaust gas flow rate with the oxygen containing gas supplied to said process inlet from said source of oxygen.

* * * * *